3,679,491
PLATINUM-RHODIUM VS. PLATINUM THERMO-COUPLE HAVING BASE METAL COMPENSATING LEADS
Edward D. Zysk, Livingston, and Eugene E. Osovitz, Englishtown, N.J., assignors to Engelhard Minerals & Chemicals Corporation
Filed Feb. 18, 1971, Ser. No. 116,437
Int. Cl. H01v 1/02
U.S. Cl. 136—236       5 Claims

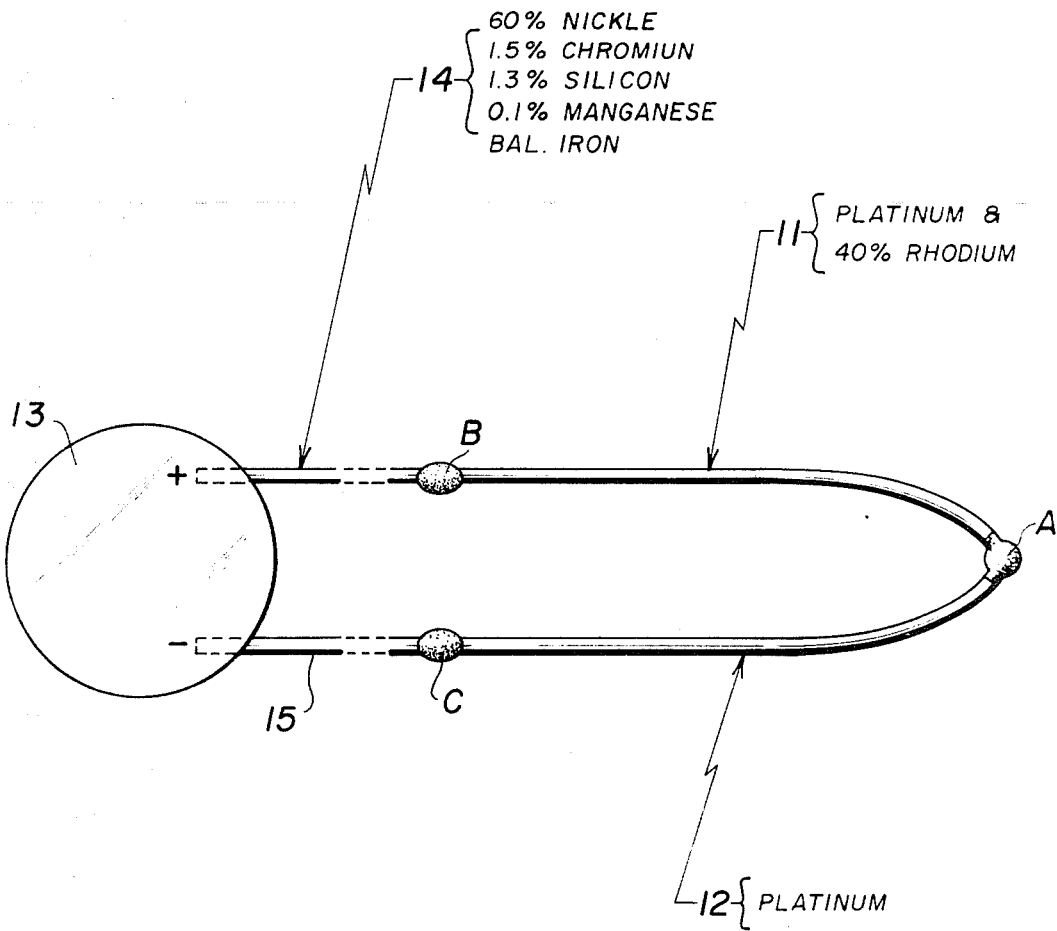

ABSTRACT OF THE DISCLOSURE

A thermocouple comprising platinum-40% rhodium vs. platinum as thermocouple legs, with each leg having connected thereto a base metal compensating lead closely approximating the E.M.F. output of its respective thermocouple leg, measured against a common standard thermocouple element, over the range of 100° C. to 1000° C. One of the leads being composed of 60% Ni, 15% Cr, 1.3% Si, 0.1% Mn and the balance Fe. The other lead being composed of 95.31% Ni, 4.49% W and 0.2% of at least one of Mn and Si.

BACKGROUND OF THE INVENTION

In the type of thermocouple with which the present invention is concerned a pair of dissimilar platinum group metal thermocouple leg wires are joined at one end to form a thermoelectric couple at the junction, which is normally referred to as the "hot junction." The thermoelectric response to temperature changes at the hot junction are measured by a potentiometer connected across the free ends of the legs.

The platinum group metal legs are expensive therefore it is desirable to have the legs as short as possible and to be able to use less expensive base metal lead wires between the free ends of the thermocouple legs and the potentiometer. It is a problem however to find base metal lead wires which match the leg wires so as not to distort the potentiometer thermoelectric response of the leg wires over the range of temperatures intended to be measured by the thermocouple.

When lead wires are used the connections between the lead wires and their respective leg wires are herein referred to as the "connection points." For a suitable match the pattern of thermoelectric responses of a couple formed by the lead wires must approximately match the pattern of thermoelectric responses of the leg wires over a range of temperatures expected at the connection points when the hot junction is at a temperature within the range intended to be measured by the thermocouple.

However, in order to provide an accurate measurement of temperature, it has been recognized that the remote ends of the lead wires, or of the thermocouple legs if no lead wire is used, must be maintained at a known constant low temperature, e.g. 0° C. This junction between the lead wires and the potentiometer is herein referred to as the "reference junction." (Copper leads are used from this point to the measuring potentiometer.) In the laboratory, when accurate measurements are desired, the reference junction is maintained at 0° C. by a thermos containing a carefully prepared and maintained ice slush. In other installations, such as aircraft, missiles or chemical processes, the maintenance of an ice reference, junction is not practical and other means, e.g. electronic means, are used to maintain conditions equivalent to a constant low temperature at the reference junction. In the latter case the closeness with which the reference junction temperature is maintained may vary from device to device used. The accuracy of the temperature measured by the hot end of the thermocouple will depend on how close the reference temperature is maintained. In certain installations, such as aircraft, where space is an important factor, the providing of means, e.g. electronic means, for maintaining conditions equivalent to a low temperature at the reference junction is a considerable advantage.

SUMMARY OF THE INVENTION

In accordance with the invention it has been found that a platinum-40% rhodium (positive leg) vs. platinum (negative leg) thermocouple can be provided with certain base metal compensating or extension leads which closely match the E.M.F. output of the thermocouple within the range of 100° C. to 1000° C. One compensating lead for the positive thermocouple leg is composed of 60% Ni, 15% Cr, 1.3% Si, 0.1% Mn and balance Fe. The other compensating lead for the negative thermocouple leg is composed of 95.31% Ni, 4.49%, W and 0.2% of at least one of Mn or Si. Thus, the negative lead may be composed of 95.31% Ni, 4.49% W and 0.2% Mn or 95.31% Ni, 4.49% W and 0.2% Si or 95.31% Ni, 4.49% W and 0.2% of an alloy of Mn and Si. The metal compositions herein recited are given in weight percent.

The platinum-40% rohdium vs. platinum thermocouple described herein is capable of measuring temperatures of up to 1500° C. for long periods of time. However, when the platinum negative leg of the thermocouple contains from 0.01% to 1.2% by weight of a refractory oxide such as an oxide of thorium, hafnium, magnesium, cerium, preferably thoria, the thermocouple is capable of measuring temperatures up to 1700° C. continuously.

Of great importance is the fact that both the platinum group metal thermocouple wires and the base metal lead can be used in an oxidizing atmosphere at high temperatures without suffering a serious change in E.M.F. response patterns, for example, with the thermocouple hot junction in the operating range of 1200° C. to 1650° C. and the base metal lead wires in the operating range of 100° C. to 1000° C. Thus, in the measuring of very high temperatures in many industrial applications a great economy can be effected with use of a thermocouple-lead wire system comprising short pieces of the expensive platinum-40% rhodium vs platinum thermocouple wires and relatively longer lengths of the much less expensive base metal lead wires of the invention.

THE DRAWING

The figure of the drawing illustrates a partly elevational and partly schematic view of a thermocouple-lead wire combination of the invention and including its temperature measuring potentiometer.

DESCRIPTION OF THE PREFERRED EMBODIMENTS

The thermocouple-lead wire combination of the invention illustrated by the figure comprises a positive thermocouple leg 11 composed of platinum and 40% rhodium, a negative thermocouple leg 12 composed of platinum or platinum containing from 0.01% to 1.2% of a refractory oxide of thorium, hafnium, magnesium, cerium, etc., a lead wire 14 for the positive leg composed of 60% Ni, 15% Cr, 1.3% Si, 0.1% Mn, balance Fe, and a lead wire 15 for the negative leg composed of 95.31% Ni, 4.49% W and 0.2% of at least one of Mn and Si.

A shown in the figure, the thermocouple has a hot junction A at which the positive leg 11 is joined to the negative leg 12 by welding or other appropriate means. The thermocouple response of the leg wires 11 and 12 to variations in temperature at the hot junction A is measured by a potentiometer 13. The lead wires 14 and 15 are connected to leg wires 11 and 12 at connection points B and C, respectively. Since the lead wires are of different metal compositions, they also form a couple which has an E.M.F. output determined by the temperature at the connection points B and C. In order for the lead wires to match the leg wires in E.M.F. output, the E.M.F. output of the lead and leg wire couples should be closely equal over the temperature range expected at the connection points B and C, i.e., at temperatures between 100° C. and 1000° C.

In accordance with the invention, a comparison of lead wires to their respective thermocouple legs was made by separately determining their E.M.F. vs. temperature response against a common standard grade platinum wire established by the National Bureau of Standards and designated as platinum 27 (Pt 27) which corresponds with the negative leg of this invention. The close matching of the lead wires of the invention with the thermocouple legs is shown in the following table, which also includes other negative lead wire compositions similar to but containing only slightly less than Mn and Si content and yet show a considerably higher error factor within the range of 200° C. to 900° C.

TABLE
[EMF of wires vs. Pt 27]

| Temperature ° C | EMF millivolts | | | | | Reference junction 0° C. | | | | |
|---|---|---|---|---|---|---|---|---|---|---|
| | 100 | 200 | 300 | 400 | 500 | 600 | 700 | 800 | 900 | 1,000 |
| Pt–40 Rh | .660 | 1.535 | 2.570 | 3.738 | 5.014 | 6.408 | 7.913 | 9.526 | 11.243 | 13.069 |
| 60% Ni, 15% Cr, 1.3% Si, 0.1% Mn Bal. Fe | .864 | 2.036 | 3.453 | 5.066 | 6.844 | 6.791 | 10.915 | 13.203 | 15.667 | 18.28 |
| Wanted EMF | .204 | .501 | .883 | 1.328 | 1.830 | 2.383 | 3.002 | 3.677 | 4.424 | 5.227 |
| 95.41% Ni–4.49 W–0.2 Mn | .452 | .683 | .962 | 1.453 | 1.994 | 2.570 | 3.177 | 3.824 | 4.520 | 5.262 |
| Error to wanted values | +.248 | +.182 | +.079 | +.125 | +.164 | +.187 | +.175 | +.147 | +.096 | +.035 |
| 95.31 Ni–4.49 W–0.2 Mn | .398 | .593 | .855 | 1.337 | 1.871 | 2.440 | 3.038 | 3.679 | 4.372 | 5.110 |
| Error | +.194 | +.092 | +.028 | +.009 | +.041 | +.057 | +.036 | +.002 | −.052 | −.117 |
| 95.41 Ni–4.49W–0.1 Si | .437 | .668 | .982 | 1.455 | 1.998 | 2.578 | 3.195 | 3.854 | 4.561 | 5.324 |
| Error | +.233 | +.167 | +.099 | +.127 | +.168 | +.195 | +.193 | +.177 | +.137 | +.097 |
| 95.31 Ni–4.49 W–0.2 Si | .371 | .563 | .847 | 1.321 | 1.844 | 2.405 | 3.003 | 3.646 | 4.338 | 5.089 |
| Error | +.167 | +.062 | −.036 | −.007 | +.014 | +.022 | +.001 | −.031 | −.086 | −.138 |

It will be noted that the differences in E.M.F. of the negative lead wires of the invention (95.31% Ni, 4.49% W and 0.2% Mn or Si) are reasonably close over the range of 100° C. to 1000° C. and are particularly good within the broad range of 200° C. to 900° C.

Various modifications of the invention are contemplated within the scope of the appended claims.

What is claimed is:

1. A thermocouple and lead wire combination comprising a thermocouple positive leg wire composed of platinum–40% rhodium joined to a thermocouple negative leg wire composed of platinum, a positive lead wire composed of 60% Ni, 15% Cr, 1.3% Si, 0.1% Mn and the balance Fe connected to the positive lead wire and a negative lead wire composed of 95.31% Ni, 4.49% W and 0.2% of at least one of Mn and Si connected to the negative leg wire.

2. A thermocouple and lead wire combination according to claim 1, wherein the negative lead wire is composed of 95.31% Ni, 4.49% W and 0.2% Mn.

3. A thermocouple and lead wire combination according to claim 1, wherein the negative lead wire is composed of 95.31% Ni, 4.49% W and 0.2% Si.

4. A thermocouple and lead wire combination according to claim 1, wherein the thermocouple negative leg wire is composed of platinum and from 0.01% to 1.2% of a refractory oxide.

5. A thermocouple and lead wire combination according to claim 4, wherein the thermocouple negative leg wire is composed of platinum and from 0.01% to 1.2% of thoria.

References Cited
UNITED STATES PATENTS 3,508,975 4/1970 Osovitz et al. _____ 136—236
3,451,859 6/1969 Zysk et al. _____ 136—236

BENJAMIN R. PADGETT, Primary Examiner

H. E. BEHREND, Assistant Examiner

U.S. Cl. X.R.

136—227